(12) United States Patent
Ishii

(10) Patent No.: US 7,515,356 B2
(45) Date of Patent: Apr. 7, 2009

(54) OPTICAL DISK APPARATUS WITH PROTECTION MEMBER FOR OBJECTIVE LENS

(75) Inventor: Kazuyoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 425 days.

(21) Appl. No.: 11/490,144

(22) Filed: Jul. 21, 2006

(65) Prior Publication Data

US 2007/0047423 A1    Mar. 1, 2007

(30) Foreign Application Priority Data

Aug. 31, 2005   (JP)   ............... 2005-251612

(51) Int. Cl.
*G02B 13/18*    (2006.01)
(52) U.S. Cl. ............ 359/719; 359/718; 359/811
(58) Field of Classification Search ........ 359/718, 359/719, 811, 813, 815
See application file for complete search history.

(56) References Cited

U.S. PATENT DOCUMENTS

| | | | |
|---|---|---|---|
| 5,995,304 A | 11/1999 | Nomura et al. | 359/726 |
| 6,781,946 B2 | 8/2004 | Murata et al. | 369/112.23 |
| 6,857,125 B2 | 2/2005 | Makino et al. | 720/671 |
| 6,999,401 B2 * | 2/2006 | Tanaka | 369/112.23 |
| 2003/0107973 A1 | 6/2003 | Makino et al. | 720/719 |
| 2003/0174634 A1 | 9/2003 | Tanaka | 369/112.23 |
| 2005/0281148 A1 | 12/2005 | Ishii | |
| 2006/0233090 A1 | 10/2006 | Ishii | |

FOREIGN PATENT DOCUMENTS

| | | |
|---|---|---|
| EP | 1 548 717 A1 | 6/2005 |
| JP | 2-54433 | 2/1990 |
| JP | 10-320802 | 12/1998 |
| JP | 11-312322 | 11/1999 |
| JP | 2002-222535 | 8/2002 |
| JP | 2003-29003 | 1/2003 |
| JP | 2004-234751 | 8/2004 |
| JP | 2005-222667 | 8/2005 |
| KR | 2002-0040599 | 5/2002 |
| WO | WO 00/49445 | 8/2000 |

OTHER PUBLICATIONS

Notice of Allowance issued from the Korean Intellectual Property Office dated Sep. 9, 2007, issued in corresponding Korean patent application No. 10-2006-0081438.

* cited by examiner

*Primary Examiner*—Timothy J Thompson
(74) *Attorney, Agent, or Firm*—Fitzpatrick, Cella, Harper & Scinto

(57) ABSTRACT

A protection member for preventing the contact of an objective lens with an optical disk is a thin plate member composed of an elastic material softer than a cover layer of the optical disk and has a plurality of convex-shaped parts formed on a surface thereof, which is opposed to the optical disk, so as to surround the objective lens.

6 Claims, 3 Drawing Sheets

OPTICAL DISK APPARATUS WITH PROTECTION MEMBER FOR OBJECTIVE LENS

BACKGROUND OF THE INVENTION

1. Field of the Invention

The present invention relates to an optical disk apparatus for performing recording or reproduction of an information signal by focusing a light beam on an information signal recording layer of an optical disk using an objective lens.

2. Related Background Art

Up to now, an optical disk apparatus for recording an information signal on the information signal recording layer by focusing laser light as a very small light spot on an information signal recording layer of an optical disk through an objective lens, or reproducing a recorded information signal from light reflected therefrom has been put to practical use. In recent years, a numerical aperture (NA) of the objective lens in the optical disk apparatus can be increased to 0.8 or more by improvements in design and manufacturing technique of the objective lens. When the objective lens having the high NA is used, a smaller light spot can be formed. As a result, resolutions of recording and reproduction are improved, and therefore the capacity of the optical disk can be increased.

A conventional normal optical disk typically includes an information signal recording layer located on a substrate which is made of a transparent resin material and has a thickness of 0.6 mm to 1.2 mm. The information signal recording layer is irradiated with laser light through the substrate. However, a focal length, that is, a distance between the objective lens and the information signal recording layer becomes shorter as the NA of the objective lens increases. Therefore, it is difficult to focus the laser light on the information signal recording layer through the substrate having a thickness of 0.6 mm to 1.2 mm. In order to solve such the problem, it has been proposed that the NA of an objective lens is increased and an optical disk in which a transparent cover layer thinner than the substrate is formed on the information signal recording layer are used to irradiate the information signal recording layer with laser light through the cover layer.

FIG. 5 shows a schematic structure of an optical disk apparatus as described above. Reference numeral 1 denotes an optical disk, 2 denotes an optical head, and 3 denotes a spindle motor for driving and rotating the optical disk 1. The optical head 2 includes a laser light source 6, a collimator lens 7, a beam splitter 8, a focusing lens 9 having NA of about 0.85, a light-receiving element 10, an objective lens 20, and an actuator 11 for controlling the focusing and tracking of the objective lens 20.

The optical disk 1 includes a substrate 12, an information signal recording layer 13 which is formed on the substrate 12 and made of a phase changing material a phase state of which can be reversibly changed, and a cover layer 14 which is made of a transparent resin material and has a thickness of approximately 0.1 mm. The information signal recording layer 13 has spiral or concentric circular recording tracks formed thereon. The information signal recording layer 13 may be made of a magneto-optical recording material or may be a metallic reflective film on which pits (concaves and convexes) are formed. The optical head 2 is located on a side of the optical disk 1 and is opposed to the cover layer 14.

FIG. 6 is a perspective view showing a structure of the actuator 11. The actuator 11 includes a fixed part 15 and a movable part 16. The fixed part 15 is composed of permanent magnets 17a and 17b, a yoke 18, and a supporting base 19. The movable part 16 is composed of the objective lens 20, a focus coil 21, a tracking coil 22, and a lens supporting member 23 for supporting the objective lens 20, the focus coil 21, and the tracking coil 22. Elastic supporting members 24a, 24b, 24c and 24d are linear and have elasticity and high conductivity. One end of each of the elastic supporting members is fixed to the supporting base 19. The other end of each of the elastic supporting members is supported on a side surface of the lens supporting member 23 such that the movable part 16 can be freely moved in a perpendicular direction and a radial direction relative to the optical disk 1. The elastic supporting members 24a, 24b, 24c and 24d are electrically connected with the focus coil 21 and the tracking coil 22 on the lens supporting member 23.

As shown in FIG. 5, the optical disk apparatus further includes an error signal generating circuit 4 and a control circuit 5 which are used to perform focusing control and tracking control with respect to the actuator 11. The control circuit 5 supplies control currents to the focus coil 21 and the tracking coil 22 through the elastic supporting members 24a, 24b, 24c and 24d.

When an information signal is to be recorded, the optical disk 1 is rotated and driven by the spindle motor 3. In such the state, laser light which is generated from the laser light source 6 and pulse-modulated based on the information signal is converted into parallel light by the collimator lens 7. The parallel light passes through the beam splitter 8 and is converged by the objective lens 20, so that the converged light is focused as a very small light spot on the information signal recording layer 13 through the cover layer 14 of the optical disk 1.

The information signal recording layer 13 of the optical disk 1 is repeatedly heated and cooled by irradiation with the pulse-modulated laser light. A recording mark having a phase state changed to an amorphous phase or a crystalline phase according to a change in process is recorded as the information signal.

Even when the information signal is to be reproduced, the optical disk 1 is rotated and driven by the spindle motor 3. With such the state, laser light having a predetermined intensity which is generated from the laser light source 6 is focused as a very small light spot on the information signal recording layer 13 through the cover layer 14 of the optical disk 1. At this time, an intensity of light reflected on the information signal recording layer 13 is changed corresponding to the recording mark, thereby reproducing the information signal.

During operations of recording and reproducing the information signal, a light beam reflected on optical disk 1 is reflected by the beam splitter 8, focused by the focusing lens 9, and detected by the light-receiving element 10. The light-receiving element 10 has a plurality of divided light-receiving surfaces. A focus error signal and a tracking error signal are generated from signals detected on the respective light-receiving surfaces by the error signal generating circuit 4.

The control circuit 5 supplies control currents based on the focus error signal and the tracking error signal to the focus coil 21 and the tracking coil 22 through the elastic supporting members 24a, 24b, 24c, and 24d. The actuator 11 drives the movable part 16 in a direction in which the movable part 16 moves toward or away from the optical disk 1 in a direction perpendicular to the optical disk 1 or in a radial direction orthogonal to recording tracks by an electromagnetic force caused by interaction of the control currents and magnetic fluxes generated from the permanent magnets 17a and 17b.

Therefore, even when the optical disk 1 is displaced in the perpendicular direction with respect thereto by a side-runout thereof, the focusing is controlled such that a light spot follows the displaced optical disk 1 and the light spot is precisely focused on the recording track. Even when the recording track is displaced in the radial direction by decentering, the tracking is controlled such that the recording track is scanned with the light spot following the recording track.

In the above-mentioned optical disk apparatus, a gap (working distance) between the objective lens 20 and the surface of the cover layer 14 is as very small as 0.2 mm to 0.6 mm. When the actuator 11 is performing the normal focusing control operation, the gap between the objective lens 20 and the surface of the cover layer 14 is continuously maintained to be equal to the working distance.

However, when an external shock or vibration is applied to the optical disk apparatus during non-operation in which the actuator 11 does not perform the control operation, or when the actuator 11 is out of control because a normal error signal is not obtained during the control operation by the influence of the external shock or vibration or the influence of contamination or scratch on the optical disk 1, the movable part 16 excessively moves to approach the optical disk 1 or may be in contact with the optical disk 1. Further, in view of the practical assembly precision of the optical disk apparatus, it is difficult to provide a mechanism such as a stopper for limiting the excessive movement of the movable part 16 at a position within the working distance.

Therefore, it is difficult to completely prevent the contact of the movable part 16 with the optical disk 1 which is caused by the excessive movement of the movable part 16. Thus, it is necessary to take measures for preventing the surface of the objective lens 20 and the surface of the optical disk 1 from being damaged so as not to degrade the recording and reproduction performances of the information signal even when the contact occurs.

With respect to examples of the measures, an apparatus in which a circular protection member is provided around the objective lens to protrude closer to the optical disk side than the objective lens is described in Japanese Patent Application Laid-Open No. H10-320802. In addition, an apparatus in which a coating layer made of a soft material is provided as a protection member for the objective lens on the lens supporting member to protrude closer to the optical disk side than the objective lens is disclosed in Japanese Patent Application Laid-Open No. 2002-222535.

According to the above-mentioned apparatuses, even when the movable part including the objective lens excessively moves toward the optical disk, the protection member is in contact with the optical disk, thereby preventing at least direct contact between the objective lens and the optical disk.

In the conventional apparatus in which the protection member is provided as described in Japanese Patent Application Laid-Open No. H10-320802 or 2002-222535, the direct contact of the object lens with the optical disk is avoided, so that the damage to the objective lens can be prevented. However, the protection member is brought into contact with the optical disk, so that the damage to the cover layer of the optical disk cannot be completely prevented. In particular, linear sliding scratch generated on the surface of the cover layer by the contact with the optical disk during the rotation thereof causes, for example, a reduction in intensity of the light spot focused on the information signal recording layer or a change in intensity distribution thereof. Therefore, the recording and reproduction performance of the information signal is reduced. This is not desirable.

When the working distance is shortened with an increase in NA of the objective lens, the contact frequency between protection member and the optical disk increases. Therefore, the number of sliding scratches and a size thereof are increased by the repetition of contact. At the same time, a diameter of a light beam incident on the surface of the cover layer is shortened with a reduction in a thickness of the cover layer, so that the sliding scratch generated on the surface of the cover layer more significantly influences the light spot. Further, rotating speed of the optical disk, that is, relative moving speed thereof increases with an increase in recording and reproduction speed of the information signal, larger scratch is produced.

For reasons as described above, even when the protection member for the conventional apparatus is applied to an optical disk apparatus which is provided with an objective lens having a higher NA and used for recording and reproducing an information signal on and from an optical disk including a thin cover layer at high speed, sufficient performance for protecting the optical disk cannot be obtained.

SUMMARY OF THE INVENTION

An object of the present invention is to provide an optical disk apparatus capable of obtaining sufficient performance of protecting an optical disk.

An optical disk apparatus according to the present invention is an optical disk apparatus for performing the recording or reproduction of information with respect to an optical disk including an information signal recording layer and a transparent cover layer provided on the information signal recording layer, includes:

an objective lens for focusing a light beam on the information signal recording layer through the cover layer;

a lens supporting member for supporting the objective lens; and a protection member provided on the lens supporting member, for protecting the objective lens, wherein the protection member is composed of an elastic material softer than the cover layer of the optical disk and has a plurality of convex-shaped parts provided on a surface of the protection member.

Further features of the present invention will become apparent from the following description of exemplary embodiments (with reference to the attached drawings).

DETAILED DESCRIPTION OF THE PREFERRED EMBODIMENTS

Figure 1:
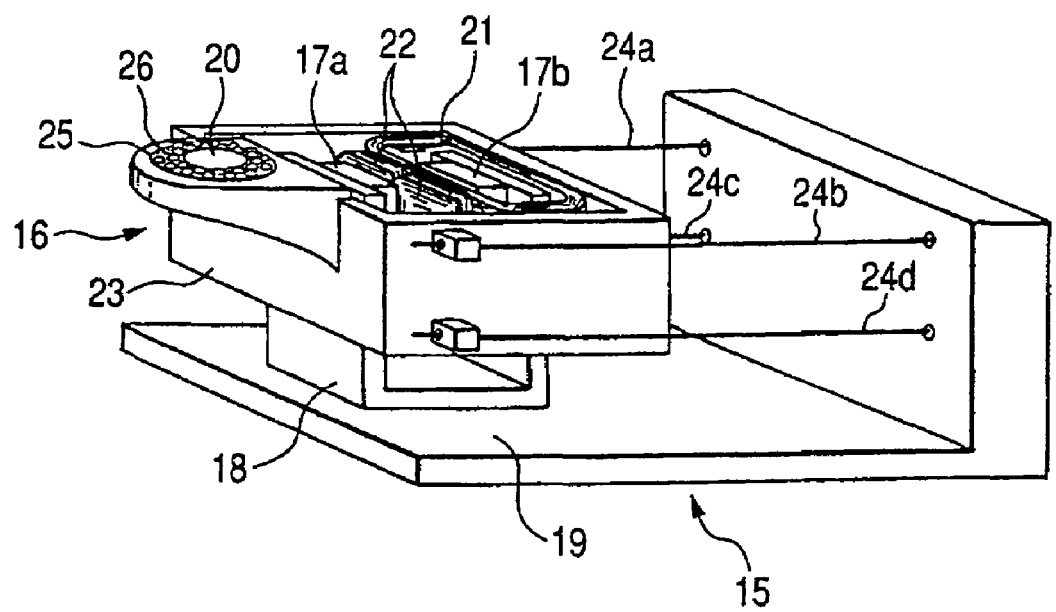
FIG. 1 is a perspective view showing a structure of an actuator of an optical disk apparatus according to the present invention.

The preferred embodiments of the present invention will be described in detail with reference to the accompanying drawings. FIG. 1 is a perspective view showing a structure of an actuator of an optical disk apparatus according to the present invention. In FIG. 1, the same reference numerals are provided for the same parts as those of the conventional actuator shown in FIG. 6. A structure and an operation of the optical disk apparatus according to the present invention are the same as those of the conventional optical disk apparatus shown in FIG. 5, and thus the detailed description thereof is omitted here.

An actuator 11 of the optical disk apparatus will be described in detail with reference to FIG. 1. The actuator 11 includes a fixed part 15 and a movable part 16. The fixed part 15 is composed of permanent magnets 17a and 17b, a yoke 18, and a supporting base 19. The movable part 16 is composed of an objective lens 20 having NA of 0.8 or more, a focus coil 21, a tracking coil 22, and a lens supporting member 23 for supporting the objective lens 20, the focus coil 21, and the tracking coil 22. A protection member 25 is provided on the lens supporting member 23 around the objective lens 20.

Elastic supporting members 24a, 24b, 24c, and 24d are linear and have elasticity and high conductivity. One end of each of the elastic supporting members is fixed to the supporting base 19. The other end of each of the elastic supporting members is supported on a side surface of the lens supporting member 23 such that the movable part 16 can be freely moved in a perpendicular direction and a radial direction relative to an optical disk 1. The elastic supporting members 24a, 24b, 24c, and 24d are electrically connected with the focus coil 21 and the tracking coil 22 in the lens supporting member 23.

Figure 2:
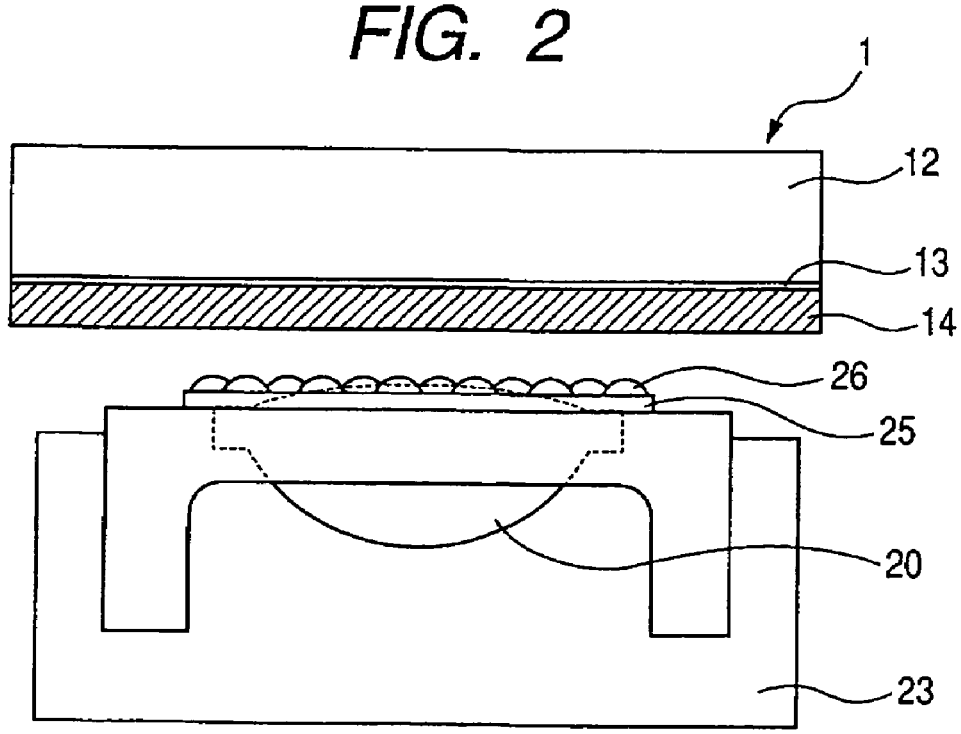
FIG. 2 is an enlarged view showing an objective lens, a protection member, and vicinities thereof in the optical disk apparatus according to the present invention.

FIG. 2 is an enlarged view showing the objective lens 20, the protection member 25, and their vicinities. The protection member 25 has a circular shape and is a thin plate made of an elastic material softer than a cover layer 14 of the optical disk 1. A plurality of convex-shaped parts 26 protrude slightly from the surface level of the objective lens 20 are formed on a surface of the protection member 25, which is opposed to the optical disk 1, so as to surround the objective lens 20.

Figure 5:
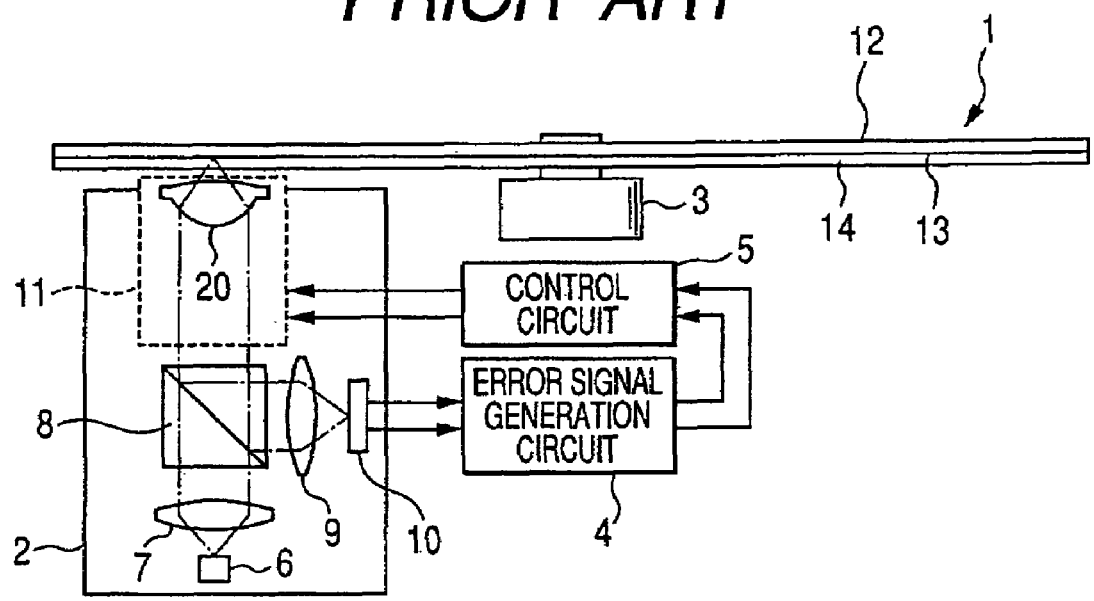
FIG. 5 is a schematic structural view showing a conventional optical disk apparatus.
Figure 6:
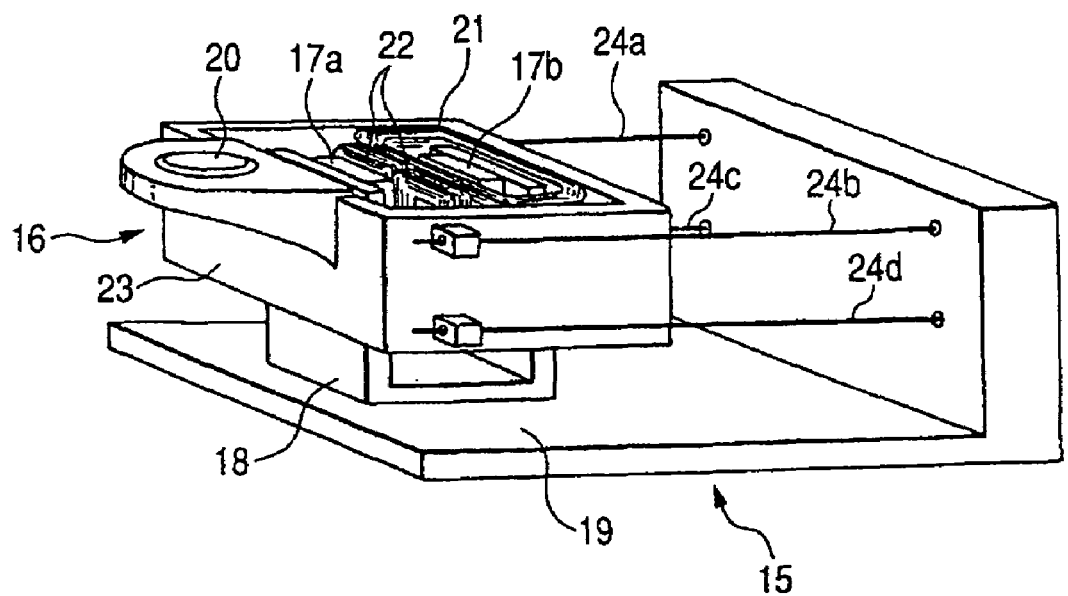
FIG. 6 is a perspective view showing a structure of an actuator of the conventional optical disk apparatus.

As shown in FIG. 5, the optical disk apparatus further includes an error signal generating circuit 4 and a control circuit 5 which are used to perform focusing control and tracking control of the actuator 11. The control circuit 5 supplies control currents to the focus coil 21 and the tracking coil 22 through the elastic supporting members 24a, 24b, 24c, and 24d.

When the actuator 11 is performing the normal focusing control operation, a constant working distance is continuously maintained between the objective lens 20 and the surface of the cover layer 14. However, when external shock or vibration is applied to the optical disk apparatus during non-operation in which the actuator 11 does not perform the control operation or when the actuator 11 is out of control because, for example, a normal error signal cannot be obtained even during the control operation by the influence of the external shock or vibration or the influence of contamination or a scratch on the optical disk 1, the movable part 16 excessively moves to approach the optical disk 1 or may be brought into contact with the optical disk 1.

In such the case, the protection member 25 which protrudes from the surface level of the objective lens 20 is brought into contact with the cover layer 14 of the optical disk 1. Therefore, it is possible to protect the objective lens 20 and prevent the generation of a sliding scratch on the cover member 14.

The protection member 25 is made of the elastic material and the convex-shaped parts which are easily compressed and deformed in a height direction thereof are formed on the surface thereof. Therefore, the convex-shaped parts 26 are compressed at the time of contact with the cover layer 14, so that the shock can be absorbed. Thus, a pressing force applied to the cover layer 14 is reduced, with the result that the generation of the sliding scratch on the cover member 14 can be suppressed as compared with the case where a protection member made of merely a soft plate material is used.

A contact area between the protection member 25 and the cover layer 14 is reduced to expand a space, so that an amount of dust which is sandwiched and pressed between the protection member 25 and the cover layer 14 decreases, thereby making it possible to suppress the generation of the sliding scratch. The movable part 16 is not necessarily brought into contact with the optical disk 1 while maintaining a posture parallel therewith. Therefore, in order to prevent the contact of the objective lens 20 with the optical disk 1 even when the movable part 16 is in a tilted posture, it is desirable to arrange the plurality of convex-shaped parts 26 around the objective lens 20.

Next, specific examples of the protection member 25 according to the present invention will be described. In each of the following examples, the cover layer 14 of the optical disk 1 is made of polycarbonate. An interval (working distance) between the center of the objective lens 20 (position closest to the cover layer 14 of the optical disk 1) during operation under control by the actuator 11 and the cover layer 14 is set to 0.3 mm. However, the present invention is not limited by the following examples.

EXAMPLE 1

Figure 3A:
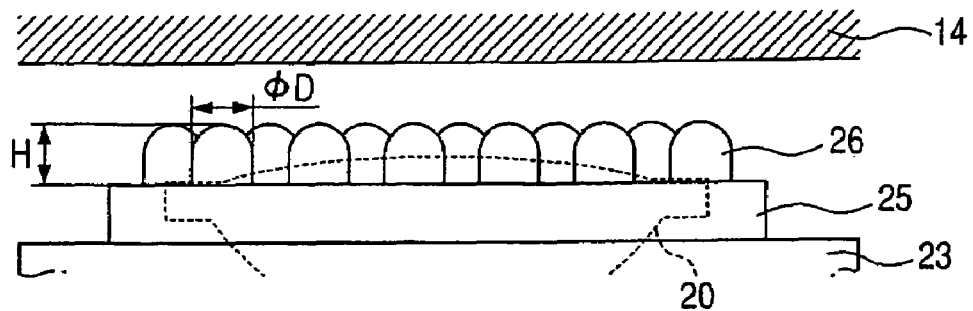
FIGS. 3A and 3B are schematic views showing a protection member according to Example 1 of the present invention.

FIG. 3A shows the protection member 25 according to Example 1 as viewed from the side thereof. The protection member 25 is a sheet made of a soft elastic material such as polyurethane. A large number of columnar convex-shaped parts 26 are formed on a surface side of the protection member 25 which is opposed to the optical disk 1 so as to surround the circumference of the objective lens 20. An upper portion of each of the convex-shaped parts 26 is formed in a substantially hemispherical shape. A diameter D of each of the convex-shaped parts 26 is 0.1 mm and a height H thereof is 0.1 mm. The convex-shaped parts 26 are arranged at a center interval of 0.13 mm to 0.16 mm. An adhesive material layer is formed on a back surface side of the protection member 25.

The protection member 25 is bonded onto the lens supporting member 23 such that each of the convex-shaped parts 26 becomes higher than the center of the objective lens 20 by 0.06 mm.

Figure 3B:
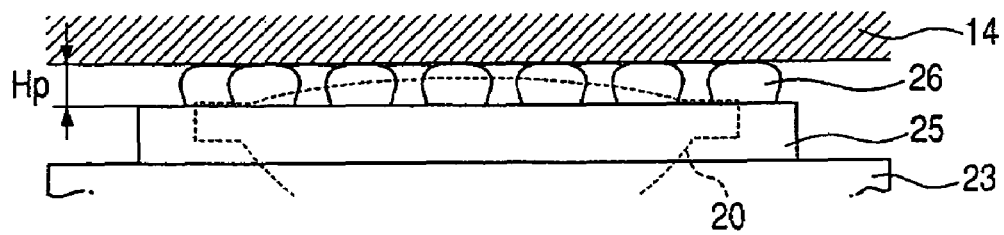

When the protection member 25 is in contact with the cover layer 14 of the optical disk 1, as shown in FIG. 3B, the convex-shaped parts 26 are elastically compressed and deformed in the height direction. Therefore, shock can be absorbed to reduce the pressing force. A maximum amount of compression and deformation of each of the convex-shaped parts 26 is 0.03 mm. That is, a height Hp at the time of deformation is 0.07 mm. Even in such the case, each of the convex-shaped parts 26 is higher than the center of the objective lens 20 by 0.03 mm. Thus, there is no case where the objective lens 20 is brought into contact with the cover layer 14 of the optical disk 1.

EXAMPLE 2

Figure 4A:
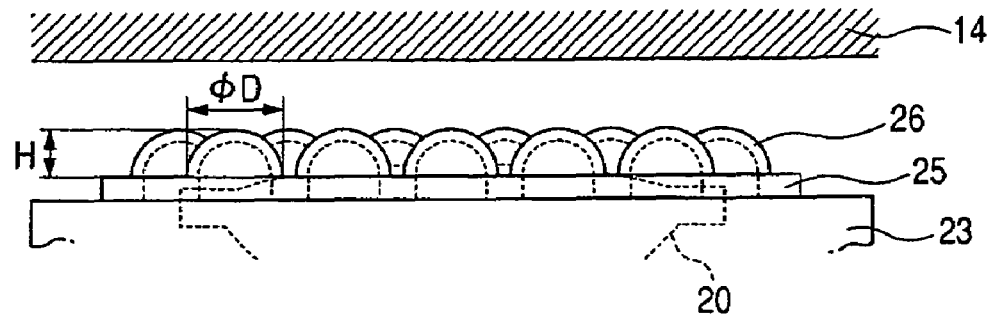
FIGS. 4A and 4B are schematic views showing a protection member according to Example 2 of the present invention.

FIG. 4A shows the protection member 25 in Example 2 as viewed from the side thereof. The protection member 25 is a sheet made of a soft elastic material such as silicon rubber. A large number of convex-shaped parts 26, each of which has a substantially hemispherical shape, are formed by embossing on a surface side of the sheet which is opposed to the optical disk 1. A diameter D of each of the convex-shaped parts 26 is 0.16 mm and a height H thereof is 0.08 mm. The convex-shaped parts 26 are arranged at a center interval of 0.2 mm to 0.25 mm. An adhesive material layer is formed on a back surface side of the protection member 25.

The protection member 25 is bonded onto the lens supporting member 23 such that each of the convex-shaped parts 26 becomes higher than the center of the objective lens 20 by 0.06 mm.

Figure 4B:
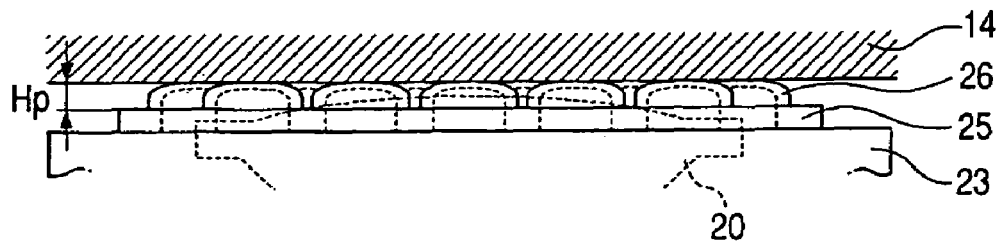

When the protection member 25 is in contact with the cover layer 14 of the optical disk 1, as shown in FIG. 4B, the convex-shaped parts 26 are elastically compressed and deformed in the height direction, whereby shock can be absorbed to reduce the pressing force. The maximum amount of compression and deformation of each of the convex-shaped parts 26 is 0.04 mm. That is, a height Hp at the time of deformation is 0.04 mm. Even in such the case, each of the convex-shaped parts 26 is higher than the center of the objective lens 20 by 0.02 mm. Thus, there is no case where the objective lens 20 is brought into contact with the cover layer 14 of the optical disk 1.

In this example, an inner portion of each of the convex-shaped parts 26 is hollow. Therefore, the amount of elastic deformation in the height direction of each of the convex-shaped parts 26 can be further increased. Thus, it is possible to improve a capacity for reducing the pressing force and absorbing the shock.

In any of the examples described above, the upper portion of each of the convex-shaped parts 26 are formed in a curved shape to reduce the contact area with the cover layer 14. In addition, the adjacent convex-shaped parts 26 are provided at an appropriate interval to form a sufficient space. Therefore, the amount of dust which is sandwiched and pressed between the protection member 25 and the cover layer 14 can be reduced, thereby making it possible to suppress the generation of a sliding scratch.

The shape of each of the convex-shaped parts 26 is not limited to those in the above-mentioned examples and thus another shape such as a columnar shape, a cone shape, or a base shape may be employed provided that the upper portion thereof is formed in the curved shape. In order to cause sufficient elastic deformation, it is desirable that an aspect ratio (height/diameter) of each of the convex-shaped parts 26 be set to 0.5 or more, or a hollow part be formed in an inner portion thereof. In a normal use environment, a diameter of most dust deposited on the optical disk is 0.04 mm or less. Therefore, when the height of each of the convex-shaped parts 26 is set to a value larger than 0.04 mm, there is almost no dust which is sandwiched and pressed between the protection member 25 and the cover layer 14 at least in a space between the adjacent convex-shaped parts 26. Thus, the generation of the sliding scratch can be significantly suppressed.

The improvement of sliding property which is achieved by coating the surface of the protection member 25 with diamond-like carbon (DLC) is also effective in reducing the number of sliding scratches.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Laid-Open No. 2005-251612, filed Aug. 31, 2005, which is hereby incorporated by reference herein in its entirety.

What is claimed is:

1. An optical disk apparatus for performing recording or reproduction of information with respect to an optical disk including an information signal recording layer and a transparent cover layer provided on the information signal recording layer, comprising:
    an objective lens for focusing a light beam on the information signal recording layer through the cover layer;
    a lens supporting member for supporting the objective lens; and
    a protection member provided on the lens supporting member, for protecting the objective lens,
    wherein the protection member is composed of an elastic material softer than the cover layer of the optical disk and has a plurality of convex-shaped parts provided on a surface of the protection member.

2. An optical disk apparatus according to claim 1, wherein the protection member is provided to surround the objective lens.

3. An optical disk apparatus according to claim 1, wherein the protection member is composed of one selected from the group consisting of silicon rubber and polyurethane.

4. An optical disk apparatus according to claim 1, wherein each of the convex-shaped parts of the protection member has a height such that the cover layer is not brought into contact with the objective lens even when the convex-shaped parts are brought into contact with the cover layer and elastically deformed.

5. An optical disk apparatus according to claim 1, wherein a hollow part is provided in each of the convex-shaped parts of the protection member.

6. An optical disk apparatus according to claim 1, wherein the objective lens has a numerical aperture of 0.8 or more.

* * * * *